E. S. BASTON.
CORN CULTIVATOR.
APPLICATION FILED APR. 5, 1915.
1,204,840.
Patented Nov. 14, 1916.
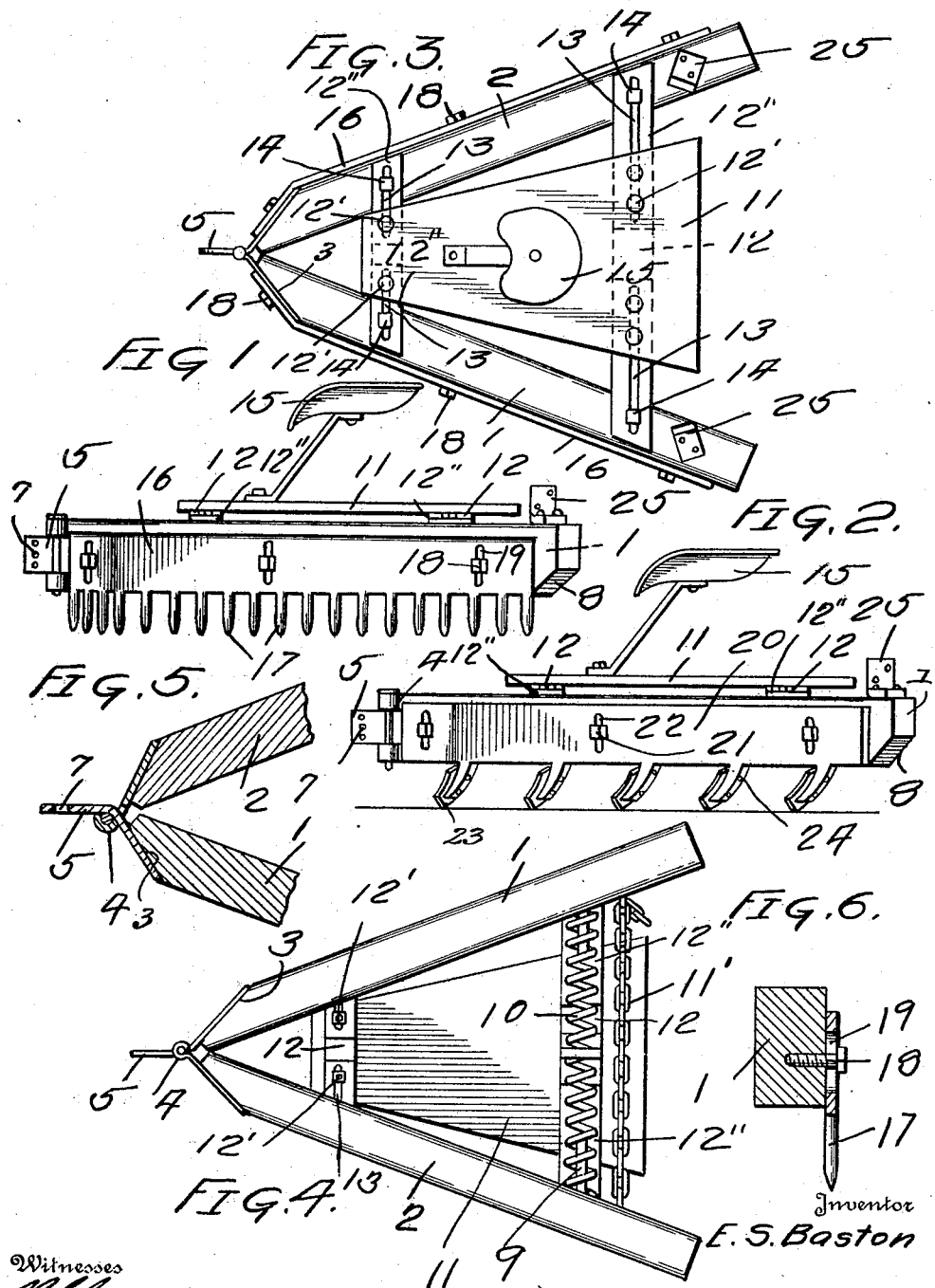

ary, to the runners.
UNITED STATES PATENT OFFICE.

EDWARD S. BASTON, OF GEORGETOWN, KENTUCKY.

CORN-CULTIVATOR.

1,204,840.  Specification of Letters Patent.  Patented Nov. 14, 1916.

Application filed April 5, 1915. Serial No. 19,302.

*To all whom it may concern:*

Be it known that I, EDWARD S. BASTON, a citizen of the United States, residing at Georgetown, in the county of Scott, State of Kentucky, have invented certain new and useful Improvements in Corn-Cultivators; and I do hereby declare the following to be a full, clear, and exact description of the invention, such as will enable others skilled in the art to which it appertains to make and use the same.

This invention relates to a corn cultivator.

An object of the invention resides in the provision of a device by means of which soil may be plowed and harrowed.

A further object of the invention resides in so constructing the device that plows and harrow teeth are provided so as to be detachable and interchangeably mounted upon the body of the device.

A further object of the invention resides in so constructing the device that after the soil has been plowed or harrowed the top will be packed so as to retain the moisture therein.

A further object of the invention resides in the provision of means in the device for the adjustment of the plow or harrow teeth so that the distance of penetration of the same into the ground may be varied.

A still further object of the invention resides in so constructing the device that it may be adjusted to vary the width thereof so that it will be adapted to be used between rows of corn of various widths.

With these and other objects in view, such as will appear as the description progresses, my invention comprises the combination and arrangement of parts as set forth in and falling within the scope of the appended claims.

Referring to the drawing: Figure 1 is a side elevation of my device, showing the harrow teeth mounted thereon. Fig. 2 is a similar view showing the plows thereon. Fig. 3 is a plan view of my device. Fig. 4 is a bottom plan view. Fig. 5 is a fragmental detail, showing the manner of hinging the runners together. Fig. 6 is a fragmental detail, showing the manner of securing the harrow teeth and plows, adjustably, to the runners.

Referring to the drawing wherein like parts are indicated by like characters throughout the several views: My device comprises a pair of runners 1 and 2 which are beveled at their forward ends, as indicated at 3, and hinged together by a suitable hinge 4. The plate 5 of this hinge extends beyond the pivot 6 and is provided with a plurality of holes 7 so that it acts as a clevis to which the draft attachment may be secured. The rear ends of these runners 1 and 2 are beveled, as at 8, to prevent the digging of the ends into the soil as the device is dragged forwardly.

Mounted on pins 9 on the runners 1 and 2 and extending between the runners is a coil spring 10 which normally forces the runners apart. The movement of these runners is limited by a chain 11' which is secured to the runner 2, fixedly, and adjustably secured to the runner 1. By means of this chain 11' the runners 1 and 2 may be pulled together against the tension of the spring 10 and thus the width of the device varied.

The platform 11 is secured to cross bars, each of which comprises an intermediate section 12 to which the platform is secured by bolts 12'. These cross bars further comprise end sections 12" which have slots 13 therein through which the bolts 12' extend. Extending through these slots 13 and secured to the runners 1 and 2 are pins 14. By means of these bolts 12' and pins 14 the lengths of the cross bars may be varied. A suitable seat 15 is secured to the platform.

Referring to the structure shown in Fig. 1, I have secured a plate 16 to the outer face of each of the runners 1 and 2. These plates are provided on their lower ends with harrow teeth 17 and are secured to the runners by means of set screws 18 passing through elongated slots 19 in the plates 16 and in threaded engagement with the runners. By this construction the set screws 18 may be loosened and the plates 16 raised or lowered so that the degree of penetration of the teeth into the ground may be varied. In the structure shown in Fig. 2, I have provided plates 20 which are adjustably secured to the runners 1 and 2 by set screws 21 passing through elongated slots 22 in the plates. These plates 20 are provided with plows 23, which plows are detachably secured to the plates by bolts 24 which pass through holes in the ends of the plows. Each plow is provided with a hole at each end so that when the lower end becomes worn the plow may be removed and its position reversed by passing the bolts 24 through the hole in the worn end of the plow. Secured to the rear ends of the runners 1 and 2 are brackets 25 by means of which the ordinary guide handles, not shown, may be secured should it be desirable to use the device as a walking cultivator.

In operation when the device is used either as a harrow or plow it is drawn across the field and the harrow teeth or plows will loosen the earth. During the advance of the device the lower faces of the runners 1 and 2 will ride upon the soil after it has been loosened by the harrow teeth or plows and will pack the top of the same so that the moisture will be maintained in the soil. Now should it be desirable to pack the soil without first loosening the same the plows or cultivator teeth may be entirely omitted from the device and the device dragged between the rows of corn at which time the runners will pack the top of the soil.

By constructing the device so that the width may be varied I have adapted it for use between rows which are various distances apart. Furthermore I have so constructed the device that the runners will be separated, automatically, upon the release of the retaining means. Furthermore I have made provision for the mounting of the plates carrying the harrow teeth or plows so that they may be adjusted on the runners. This is a distinct advantage inasmuch as the degree of penetration of the plows or harrow teeth into the ground may be varied at the will of the operator.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claims.

What I claim is:—

1. In a cultivator, the combination with diverging runners hingedly secured together at their forward ends and having broad, flat, unobstructed lower faces, of plates adjustably and detachably mounted on the outer faces of said runners and having soil cultivating implements thereon.

2. In a cultivator, the combination with a pair of diverging runners hinged at their forward ends and having broad, flat, unobstructed lower faces, of plates mounted on the outer faces of said runners and having ground cultivating implements thereon, the said plates being adjustable, vertically, and means for maintaing the runners in predetermined positions.

3. In a cultivator, the combination with diverging runners hinged together at their forward ends and having broad, flat, unobstructed lower faces, of ground working implements secured to the outer faces of said runners, the said implements being adapted to loosen the soil upon the forward movement of the cultivator and the lower faces of the runners being constructed and arranged to pack the soil subsequent to the loosening thereof.

4. In a cultivator, the combination with a pair of diverging runners, of a hinge for securing the forward ends thereof together, one portion of the hinge being projected forwardly to form a clevis and means for maintaining the runners in predetermined positions.

In testimony whereof, I affix my signature, in the presence of two witnesses.

EDWARD S. BASTON.

Witnesses:
F. C. NICHOLS,
W. E. BROWNING.